Figure 1:
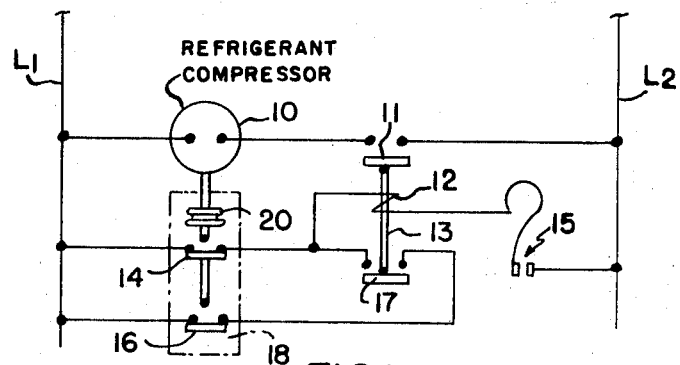

United States Patent

[11] 3,631,685

[72] Inventor Clyde L. Young
 Columbus, Ohio
[21] Appl. No. 7,761
[22] Filed Feb. 2, 1970
[45] Patented Jan. 4, 1972
[73] Assignee Ranco Incorporated
 Columbus, Ohio
 Continuation-in-part of application Ser. No. 851,558, Aug. 20, 1969, now abandoned. This application Feb. 2, 1970, Ser. No. 7,761

[54] CONTROL APPARATUS FOR DELAYING RESTART OF REFRIGERATING APPARATUS
 7 Claims, 3 Drawing Figs.
[52] U.S. Cl. .................................................. 62/158,
 62/164, 62/228, 318/452
[51] Int. Cl. ...................................................... F25d 29/00
[50] Field of Search............................................ 62/164,
 213, 158, 226, 227, 228; 318/452; 317/13

[56] References Cited
UNITED STATES PATENTS
2,697,195 12/1954 Courtney...................... 318/452
2,818,535 12/1957 Skeats........................... 317/13
3,110,160 11/1963 Miner............................ 62/164

Primary Examiner—Meyer Perlin
Attorney—Watts, Hoffmann, Fisher & Heinke

ABSTRACT: The power circuit of an electric motor of a compressor-condenser-expander-type refrigerating system is controlled by a switch operated by a solenoid, the circuit of which is controlled by a series-arranged thermostatic switch and pressure-responsive switch, the latter being closed when the compressor discharge pressure is relatively low and is opened as the pressure increases to a minimum normal operating pressure. A holding circuit switch for the solenoid is closed by energization of the solenoid and shunts out the pressure-responsive switch. Any interruption in the solenoid circuit causes deenergization of the solenoid and the circuit cannot be reestablished until the pressure-responsive switch is closed in response to the reduction in head pressure to a nominal starting value. In one form of the invention a switch is connected in parallel circuit with the pressure-responsive switch and the holding switch and is closed by a thermostat in response to an abnormally high ambient temperature of the refrigeration system so that the compressor may be started although the pressure responsive switch is open by reason of high-ambient temperatures.

PATENTED JAN 4 1972 3,631,685

INVENTOR
CLYDE L. YOUNG
BY
Watts, Hoffmann, Fisher & Heinke
ATTORNEYS

CONTROL APPARATUS FOR DELAYING RESTART OF REFRIGERATING APPARATUS

The present application is a continuation-in-part of Ser. No. 851,558 filed Aug. 20, 1969, Group No. 345 and assigned to the same assignee as the present application, now abandoned.

BACKGROUND OF THE INVENTION

The present invention relates to a control means for an electric motor driven compressor of a compressor-condenser-expander type refrigerating system. In refrigerating systems of the type mentioned, it is desirable to provide a delay between stopping and starting of the compressor motor to permit reduction in the discharge pressure of the compressor and thereby avoid overloading of the motor.

It has been the practice to provide timer devices or pressure differential responsive mechanisms for meeting these conditions. Such devices and mechanisms, however, are expensive and subject to malfunction, etc.

An object of the present invention is the provision of a new and improved means for preventing restarting of a compressor motor until the discharge pressure is at a level which will not unduly load the compressor motor.

THE INVENTION

The present invention contemplates controlling the motor of a refrigerating system of the type mentioned by a solenoid-operated main switch, the solenoid circuit being controlled by a switch operated in response to a condition affected by operation of the system, such as a temperature-responsive switch, and by a pressure-responsive switch which is opened when a normal operating head pressure exists and which is closed when the head pressure is reduced to a value which will not impose an undue torque load on the compressor motor. The solenoid circuit is maintained when the pressure-operated switch is open by a holding switch closed by energization of the solenoid. In the event of interruption in the power supply to the compressor or solenoid, the main switch opens and deenergizes the motor and the solenoid cannot then be reenergized to close the main switch until the discharge pressure of the compressor is reduced to the low starting torque value.

The improved control means can be provided at a relatively low cost by operating the pressure-responsive switch by the pressure-responsive power element of a high-pressure cutout switch mechanism usually employed in refrigerating systems of the type mentioned to shut down the system in the event of excessive head pressures.

The invention also contemplates the provision of means for providing a circuit around the pressure-responsive switch and the holding switch in the event the ambient temperature of the refrigerating system causes pressures to exist in the system which will open the pressure responsive switch although the system is not in operation. This arrangement is particularly useful in roof-located air-conditioning systems wherein the ambient temperatures of the system may be in the order of 130° F. When such systems have not been in operation, the pressure in the system will exceed the pressures at which the pressure switch of the invention is opened. This condition would otherwise prevent initiation of the system.

Figure 2:
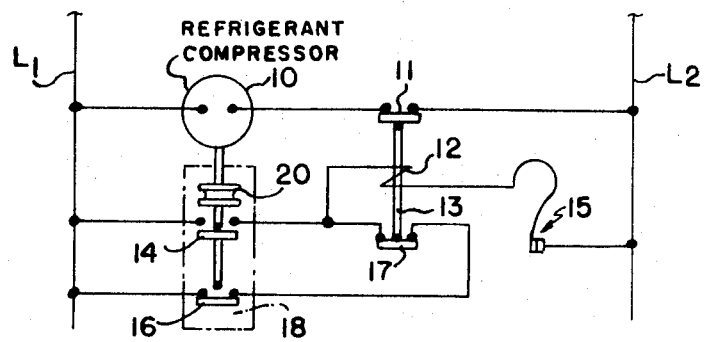
Figure 3:
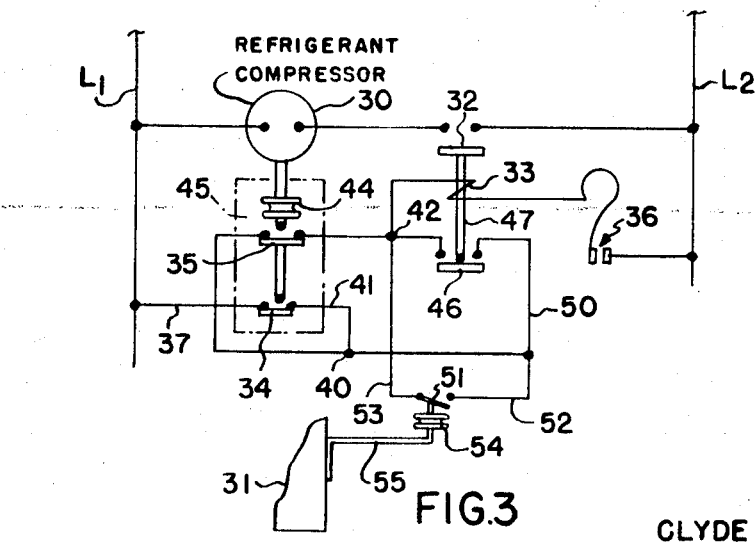

Other objects and advantages of the invention will be apparent from the following description of a preferred embodiment thereof, reference being made to the accompanying drawing wherein FIGS. 1 and 2 are wiring diagrams of a control apparatus embodying the invention for controlling operation of the motor of a refrigerating system; and FIG. 3 is a schematic view of a refrigerating system and a wiring diagram therefor embodying another form of the invention.

Referring to the drawings, an electric motor 10 is adapted to drive the compressor of a conventional compressor-condensor-evaporator type refrigerating system. Inasmuch as refrigerating systems of the type mentioned are well known, details of the system are not shown.

Power for driving the motor 10 is supplied through conventional powerlines L1, L2 which may be 120 v. or 240 v., as the case may be. One terminal of the motor 10 is connected to line L1 directly and the other terminal of the motor is connected to line L2 through a contactor switch 11. A master switch, not shown, is preferably provided to control energization of L1, L2.

The switch 11 is normally open and is closed by energization of a solenoid 12 which has a switch-operating armature 13 associated therewith. The circuit for the solenoid 12 is traced from line L1, through a pressure-responsive switch 14, a thermostatic switch 15 to line L2. A holding circuit for the solenoid 12 is provided which includes line L1, a normally closed pressure-responsive switch 16, and a normally open switch 17 which is closed by the armature 13 when the solenoid 12 is energized. The circuit, including switches 16 and 17, forms a shunt circuit around the switch 14.

The thermostatic switch 15 may be any suitable type which responds to a condition affected by operation of the refrigeration system. For sake of simplicity, it is shown to be a bimetal switch which responds to temperature of air cooled by the refrigerating system.

The switches 14 and 16 are components of a pressure-responsive control mechanism 18. The switches are normally closed and are sequentially opened by a pressure-responsive bellows 20, the interior of which is in communication with the discharge side of the refrigerant compressor and tends to expand and contract upon increases and decreases in pressure in the high-pressure side of the refrigerating system. The bellows 20 is adapted to open the switch 14 as the head pressure rises towards normal operating pressures and permits reclosing of the switch as the head pressure recedes to a value which will impose a nominal starting torque load on the motor 10. Suffice to say, such switch mechanisms include means by which the switches 14 and 16 are opened and closed at predetermined pressures in the high side of the system. The switch 16 is opened by the bellows 20 only in the event the pressures in the high side of the refrigerating system become excessive so as to require shutting down of the system. Otherwise, the switch 16 remains closed. Sequentially operated switch mechanisms of the type mentioned are well known. For sake of simplicity the switch mechanism is shown more or less schematically. Furthermore, if desired the switch 14 could be connected with line L1 through the high-pressure cutout switch 16 to insure closing down of the system by the switch 16.

In the operation of the system, assuming that the head pressure in the system is relatively low, when the switch 15 is closed in response to a call for cooling by the refrigerating system, the solenoid 12 is energized by the circuit including the closed switches 14 and 15. Energization of the solenoid 12 causes switch 11 to close and energize the compressor motor 10. At the same time holding switch 17 is closed. As the motor 10 operates the compressor, the head pressure in the refrigerating system builds toward normal and opens switch 14. The circuit for solenoid 12, however, is maintained through the closed switches 16 and 17. In the event that the circuit for the solenoid 12 is interrupted for any reason during an operating cycle of the refrigerating system, the deenergization of the solenoid 12 causes opening of the motor switch 11 and the holding switch 17. Because switch 14 is open by the existence of a nominal head pressure, the circuit for the solenoid 12 will remain open at least until the head pressure on the high side of the refrigerating system is reduced to an extent to reclose the switch. If the switch 15 is closed the solenoid 12 will be reenergized.

If the circuit to the solenoid 12 has been interrupted by opening of the switch 16 in response to excessive head pressure, that switch will reclose prior to reclosing of switch 14 as the head pressures in the refrigerating system return to normal.

It will be appreciated in light of the foregoing that regardless of the cause for termination of a refrigerating cycle, a refrigerating cycle cannot be restarted until the head pressure is such that the starting torque on the motor 10 is nominal. Normally a period of time will elapse before the head pressure is reduced sufficiently to reclose switch 14.

In some instances the refrigerating system embodying the invention may be employed in an air-conditioning system likely to be subjected to unusually high ambient temperatures. If the ambient temperatures of the system are so high as to cause the pressures in the system to open the switch 14 while the refrigerating system is idle, it would be impossible to start the system. To overcome this problem the form of the invention is employed which is disclosed in FIG. 3.

Referring to FIG. 3, a fragmentary view of a refrigerating system is shown which comprises an electric motor driven compressor 30 and an evaporator 31. It is to be understood that the compressor and evaporator are components of a conventional compressor-condenser-expander type refrigerating system which is utilized in air-conditioning systems to cool the air in a room of a building and the like. For sake of simplicity only fragments of the system are shown. The refrigerating system of FIG. 3 may be located in an environment, such as on a roof top, in which the components of the system are subject to relatively high ambient temperatures. In such instances if the system has not been in operation the pressure throughout the system will be considerably above normal operating head pressure. Under such conditions the control system shown in FIGS. 1 and 2 would not be satisfactory because the pressure-responsive switch 14 would be open and operation of the system could not be initiated. To overcome this difficulty a temperature-responsive switch is connected in parallel with the pressure-responsive switch and the holding switch in the manner described hereinafter.

The power circuit for the compressor 30 includes two lines L1, L2, of a suitable power system. The operation of the compressor is controlled by a switch 32 connected in series with the compressor motor 30 and is adapted to be closed and opened by the energization and deenergization, respectively, of a solenoid 33. The energization of solenoid 33 is controlled by a normally closed high-pressure cutout switch 34, a normally closed switch 35 and a room thermostat 36. One terminal of the switch 34 is connected to line L1 by a conductor 37 and the other terminal of the switch is connected to a junction 40 by a conductor 41. One terminal of the switch 35 is connected with the junction 40 and the other terminal of the switch is connected to a junction 42. Switch 35 is seen to be connected in series with the switch 34.

One end of the solenoid 33 is connected with junction 42 and the opposite end is connected with one terminal of the thermostatic switch 36. The other terminal of the thermostatic switch 36 is connected with line L2.

The switches 34, 35 are operated by a pressure-responsive element such as a bellows 44 which is connected with the high-pressure side of the refrigerant compressor 30. The switches 34, 35 and pressure element 44 comprise a two-stage control mechanism 45 like the pressure-responsive control mechanism 18. The bellows 44 is operative to expand and open the switch 35 in response to an increase in head pressures at the high side of the compressor from a pressure existing during the off cycle of the compressor under normal operating conditions. Unless the refrigerating system is subjected to unusually high ambient temperatures, after the compressor stops, the head pressures of the compressor will subside from normal operating pressures upon termination of operation of the condenser and switch 35 will reclose. In the event that the head pressures become excessive the power element 44 will expand to a greater degree and open the normally closed switch 34 in the same manner as described with reference to switch 16.

A holding circuit is provided for the solenoid 33, which circuit includes a switch 46 which is attached to an armature 47 actuated by the energization and deenergization of the solenoid. The switch 46 is open when the solenoid is deenergized and is closed when the solenoid is energized. One terminal of the switch 46 is connected with line L1 through a conductor 50 connected to the junction 40 and the switch 34. The other end of the solenoid is connected with junction 42 which is in turn connected with line L2 through the solenoid 33 and thermostatic switch 36.

In the event the refrigeration system has been shut down by opening the master switch controlling the power lines L1, L2, and the ambient temperature of the system is substantially higher then normal, the pressures will be high and the switch 35 will be opened by element 44. This condition prevents energization of the solenoid 33 when the master switch is closed to start the system although the thermostatic switch 36 may be closed and calling for a cooling cycle. To overcome this condition, a temperature-responsive switch 51 is provided in parallel circuit with the switches 35 and 46. One terminal of the switch 51 is connected with the conductor 50 by a conductor 52 and the other terminal of the switch is connected by a conductor 53 with junction 42. The thermostatic switch 51 is a conventional type and is arranged to be closed in response to an increase in temperature of the evaporator 31 from normal operating temperatures to a temperature corresponding to that at which pressures of the refrigerant in the system will exceed the pressure at which switch 35 is opened. Switch 51 is operated by a thermostatic element 54 which is shown to comprise a bellows having a capillary tube 55 connected therewith. The bellows and tube contain a suitable vapor to provide a pressure in the expansible element 54 according to the temperature prevailing at the coolest portion of the tube and bellows. This type of power element is well known in the art.

While the thermostatic switch 51 is shown to comprise a bellows connected with a closed fluid filled capillary tube, the interior of the bellows for operating the switch could be as well be connected into the suction line of the compressor. Because the pressure in the suction line will correspond to the temperature in the evaporator, the switch 51 would function the same as described above.

One end of the capillary 55 is suitably arranged to be in heat-exchange relation with the evaporator 31 so as to respond to its temperature. When the refrigerating system is operating normally the evaporator will be relatively cool and switch 51 will be open. When the temperature of the evaporator approaches a relatively high degree, such as 130° F. for example, the switch 51 will be closed by the thermostatic element 54. Under such conditions should the refrigerating system then be activated by the closure of the main switch for lines L1, L2, the solenoid 33 will then be energized by a circuit from line L1, switch 34, junction 40, conductors 50, 52, switch 51, conductor 53, junction 42, solenoid 33, thermostat 36 and line L2. Switches 32 and 46 will be closed by the solenoid 33 to complete the circuit for switch 30. Also a holding circuit for the solenoid 33 is established around switches 35 and 51 through switch 34. As the compressor operates the temperature of the evaporator is reduced causing switch 51 to be opened. If a momentary power failure occurs the deenergization of the solenoid 33 will cause opening of switches 32 and 46. The solenoid 33 cannot be reenergized until one or the other of the switches 35, 51 is reclosed. Normally, switch 35 would reclose prior to reclosing of switch 51 and the time delay system would operate in the manner described with reference to FIGS. 1 and 2 to prevent rapid reenergization of the compressor motor.

Thus, the invention provides a relatively simple, reliable and inexpensive means of assuring restarting of a refrigerant compressor motor only after proper pressure conditions are present in the system. Most commercial refrigerating systems employ a solenoid-operated contactor to control the motor circuit and also employ a high-pressure safety cutout switch. By merely adding a second switch to the high-pressure cutout switch mechanism which is designed to be opened during normal head pressures and closed at below operating head pressures a highly satisfactory control apparatus is provided.

I claim:

1. A refrigerating system of the compressor-condenser-expander type and including an electric motor driven refrigerant compressor, a power circuit in series with said motor and including a switch, electrically powered means operative to close said switch when said means is energized, a control circuit for said electrically powered means, a first switch in said control circuit in series with said electrically powered means and operative in response to changes in a condition to close and open said control circuit, a second switch in series with said first switch and said electrically powered means, means responsive to refrigerant pressures resulting from normal operation of said compressor to open said second switch a period after initiation of operation of said compressor and to reclose said second switch after a period after termination of operation of said compressor, and a third switch forming a shunt circuit around said second switch, said third switch being closed and opened by energization and deenergization, respectively, of said electrically powered means.

2. A refrigerating system as defined in claim 1 further characterized by said electrically powered means comprising a solenoid.

3. A refrigerating system as defined in claim 1 further characterized by said means to operate said second switch comprising a pressure-responsive element responding to changes in pressure in the high-pressure side of said refrigerating system.

4. A refrigerating system as defined in claim 3 further characterized by said pressure-responsive element being operative to open said second switch in response to an increase in pressure above a given pressure, and to close said second switch in response to a decrease in said pressure below said given pressure.

5. In the combination defined in claim 4 further characterized by a normally closed safety switch in said shunt circuit, said safety switch being normally closed and arranged to be opened by said pressure-responsive element in response to increase in said pressure to a second given high pressure.

6. A refrigerating system as defined in claim 1 further characterized by a fourth switch arranged to form a shunt circuit around said second and third switches, and means to close said fourth switch in response to a temperature of a portion of said refrigerating system higher than the normal operating temperatures of said portion, said fourth switch being open at the normal operating temperatures of said portion.

7. A refrigerating system as defined in claim 5 further characterized by said safety switch being in series circuit with said first and second switches.

* * * * *